United States Patent
Hulugundi et al.

(10) Patent No.: US 11,501,188 B2
(45) Date of Patent: Nov. 15, 2022

(54) TECHNOLOGY FOR PREDICTIVE NATURAL DISASTER RESPONSE

(71) Applicant: International Business Machines Corporation, Armonk, NY (US)

(72) Inventors: Jagadesh Ramaswamy Hulugundi, Bangalore (IN); Abhishek Solanki, Bangalore (IN); Sudhanshu Shekhar, Bangalore (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 16/744,170

(22) Filed: Jan. 15, 2020

(65) Prior Publication Data
US 2021/0216890 A1    Jul. 15, 2021

(51) Int. Cl.
*G06F 7/00* (2006.01)
*G06N 5/04* (2006.01)
(Continued)

(52) U.S. Cl.
CPC .......... *G06N 5/04* (2013.01); *A01K 29/00* (2013.01); *G06F 16/2379* (2019.01); *G06F 16/27* (2019.01); *G06N 20/00* (2019.01)

(58) Field of Classification Search
CPC .. G06F 16/27; G06F 16/2379; G06F 16/2365; G06F 21/64; G06F 21/6209;
(Continued)

(56) References Cited

U.S. PATENT DOCUMENTS 8,881,040 B2    11/2014  Li
10,261,846 B1    4/2019  Patton et al.
(Continued)

FOREIGN PATENT DOCUMENTS

JP        5961613 B2      8/2016

OTHER PUBLICATIONS

"Pet Safety and Natural Disasters—Michelson Found Animals Foundation, Pet Adoption, Microchipping, Spay & Neuter", https://www.foundanimals.org/pet-safety-natural-disaster/, retrieve Jan. 9, 2020.
(Continued)

*Primary Examiner* — Mohammad A Sana
(74) *Attorney, Agent, or Firm* — Jeffrey S LaBaw; Anthony V England; Randy Tejecla (57) ABSTRACT

In predictive natural disaster response, a server determines an affected location predicted to be affected by a natural disaster and determines whether the type of natural disaster requires relocation of an animal population at the affected location. When relocation is required, using machine learning models, the server generates a rehabilitation needs prediction for the relocation, determines an optimal location for the relocation from candidate locations, and generates a relocation plan to relocate the animal population from the affected location to the optimal location. When relocation is not required, using the machine learning models, the server generates a demands prediction for products and services at the affected location, generates a supply prediction for the products and the services at the affect location, and generates a supply plan using the demands and supply predictions.

20 Claims, 6 Drawing Sheets

(51) Int. Cl.
  *G06F 16/27* (2019.01)
  *A01K 29/00* (2006.01)
  *G06N 20/00* (2019.01)
  *G06F 16/23* (2019.01)

(58) Field of Classification Search
  CPC ..... G06F 21/602; G06F 21/6245; G06N 5/04; G06N 20/00; A01K 29/00
  See application file for complete search history.

(56) References Cited

U.S. PATENT DOCUMENTS

| | | | |
|---|---|---|---|
| 10,628,756 B1* | 4/2020 | Kuper | H04W 4/029 |
| 2019/0188089 A1 | 6/2019 | Mueller et al. | |
| 2020/0045929 A1* | 2/2020 | Strobel | A01K 1/0218 |
| 2020/0159720 A1* | 5/2020 | Leong | G06F 16/2365 |
| 2021/0059213 A1* | 3/2021 | Wooten | A01K 15/023 |

OTHER PUBLICATIONS

"Tracability applications with blockchain by Applifarm", https://www.applifarm.io/blog/en/tracability-applications-with-blockchain-by-applifarm, Dec. 3, 2018.

Christen Cupples Cooper, EdD, RDN, Emergency Food During Natural Disasters, Today's Dietitian, vol. 20, No. 1, p. 34, Jan. 2018.

Clary, Greg, "Using Blockchain for Livestock Traceability", https://www.mi-corporation.com/blog/using-blockchain-for-mobile-data-capture-and-traceability, Dec. 8, 2017.

Mohan, Pretthi, "Disaster Management Solution, Part 2: User scenarios", IBM Developer, Jan. 9, 2018.

Nawari, O. Narwari and Ravindran, Shriraam, "Blockchain and Building Information Modeling (BIM): Review and Applications in Post-Disaster Recovery", Buildings 2019, Jun. 19, 2019.

Queensland Government, "Animal welfare in natural disasters", https://www.business.qld.gov.au/industries/farms-fishing-forestry/agriculture/rural-disaster-recovery/disaster-recovery-livestock/animal-welfare, Dec. 3, 2018.

Van Arendonk, Johan, "New blockchain project involving turkeys and animal welfare", https://www.hendrix-genetics.com/en/news/new-blockchain-project-involving-turkeys-and-animal-welfare/, Jan. 24, 2018.

Waggoner, Justin W. et al., "Feeding and Watering Beef Cattle During Disasters", https://www.vetfood.theclinics.com/article/S0749-0720(18)30008-2/abstract, retrieved Jan. 9, 2020.

* cited by examiner

PREDICTED SUPPLY

Affected Zipcode: xx001
Target Zipcode(s): xx026, xx030, xx032
Species Type: DUCK

| S. No | Target Zip Codes | Product Type | Quantity | Available Date | Expired Date |
|---|---|---|---|---|---|
| 1 | xx026 | Meat | 2700 kg | 06/25 | 07/15 |
| 2 | xx026 | Egg | 7200 | 06/20 | 06/30 |
| 3 | xx030 | Meat | 1350 kg | 06/30 | 07/20 |
| 4 | xx030 | Egg | 3600 | 06/28 | 07/10 |
| 5 | xx032 | Meat | 1950 kg | 07/15 | 08/10 |
| 6 | xx032 | Egg | 5200 | 07/08 | 07/18 |

RELOCATION PLAN

Affected Zipcode: xx001
Species Type: DUCK

| S. No | Target Zip Codes | Species Count | Capacity Available | Lead Time | Vet Availability |
|---|---|---|---|---|---|
| 1 | xx026 | 1800 | Y | 14 Hrs | Immediate |
| 2 | Xx030 | 900 | Y | 18 Hrs | 4 Hrs |
| 3 | xx032 | 1300 | Y | 10 Hrs | Immediate |

TECHNOLOGY FOR PREDICTIVE NATURAL DISASTER RESPONSE

BACKGROUND

When a natural disaster is predicted to strike a location, response planning is typically focused on the needs of the human population, which includes the consumption of animal products. However, typical natural disaster response planning fails or inadequately considers the interrelationship between the human and animal populations in the biological ecosystem. This can result in the shortage of supplies and/or extended lead times in providing adequate food, services, and other essential supplies to the human population.

SUMMARY

According to an embodiment of the present invention, in implementing a method for predictive natural disaster response, a server determines at least one affected location, where the affected location is predicted to be affected by a natural disaster. The server determines whether the type of natural disaster requires relocation of an animal population at the affected location. When relocation is required, the server generates a rehabilitation needs prediction for the relocation using a set of machine learning models, where parameters input into the set of machine learning models include population data for the animal population at the affected location. The server determines at least one optimal location for the relocation from a plurality of candidate locations, using the set of machine learning models, where the parameters input into the set of machine learning models include the rehabilitation needs prediction and candidate location data for each of the plurality of candidate locations. The server generates, using the set of machine learning models, a relocation plan to relocate the animal population from the affected location to the at least one optimal location.

DETAILED DESCRIPTION

Figure 1:
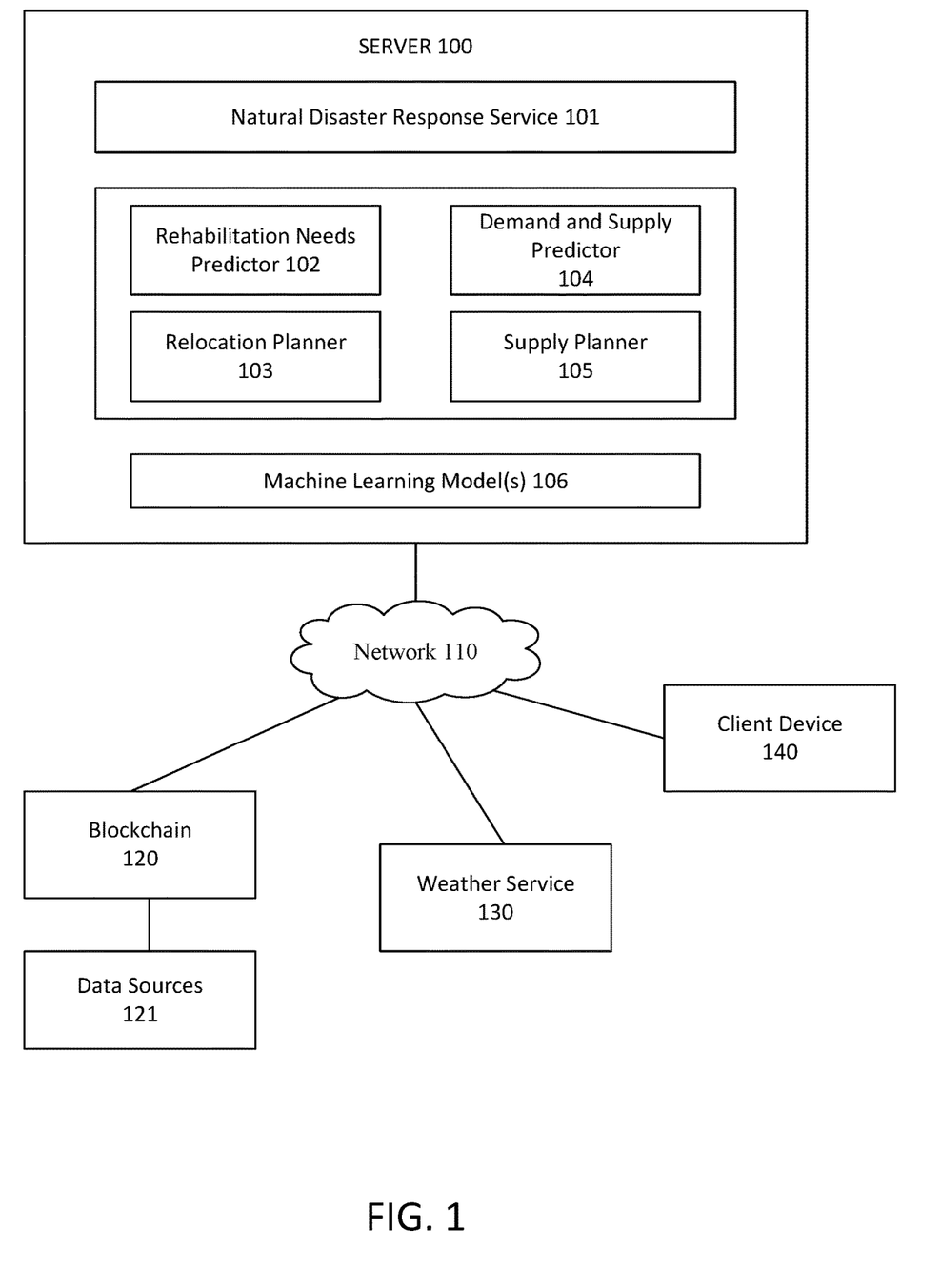
FIG. 1 illustrates a natural disaster response system according to exemplary embodiments of the present invention.

FIG. 1 illustrates a natural disaster response system according to exemplary embodiments of the present invention. The system includes a server 100 implemented by one or more computer systems, described further below with reference to FIG. 5. The server 100 is configured with a natural disaster response service 101 as described herein. The service 101 obtains or receives input data stored in a blockchain 120 and input data from one or more weather services 130 over a network 110. The blockchain 120 stores data from a plurality of data sources 121, as described further herein. The weather service 130 provides weather data and predictions of locations to be affected by a natural disaster. The service 101 is configured with a rehabilitation needs predictor 102, a relocation planner 103, a demand and supply predictor 104, a supply planner 105, and a set of one or more machine learning models 106. The rehabilitation needs predictor 102 uses machine learning models 106 to predict the rehabilitation needs of human and animal populations affected by a natural disaster. The relocation planner 103 uses machine learning models 106 to generate relocation plans to relocate human and animal populations as a response to a natural disaster. The demand and supply predictor 104 uses machine learning models 106 to predict the demand and supply of essentials by human and animal populations affected by an impending natural disaster. The supply planner 105 uses machine learning models 106 to generate supply plans for delivery of the essentials required by human and animal populations. The relocation and/or supply plans are accessible via an interface or "dashboard" at a client device 140 over the network 110.

A blockchain 120 is a continuously growing list of records, or blocks, which are linked through a hash pointer at each block which points to a previous block. This linking of the blocks allows the confirmation of the integrity of the previous block, and iteratively, all the way back to the original block. Each block further includes a timestamp and transaction data. Various timestamping schemes can be used to serialize changes to the blockchain. The design of a blockchain is inherently resistant to modification of the data in the blocks. A blockchain may serve as a distributed transaction ledger that is used to record transactions across many computers or nodes so that the record cannot be altered retroactively without altering all subsequent blocks, which requires the collusion of the network. As a distributed transaction ledger, a blockchain is typically managed by a peer-to-peer network where the nodes collectively adhere to a protocol for validating or verifying new blocks added to the blockchain. Blockchains are suitable for the recording of events, records, and other types of activities.

Exemplary embodiments of the present invention leverage the blockchain to store data related to geographic locations and human and animal demand and supply chains from a plurality of data sources 121 to ensure the integrity of the data. The integrity of the data is of particular importance in responding to a natural disaster, when human and/or animal populations are displaced or when more typical channels of information may be compromised. The data stored in the blockchain 120 is efficient to manage, have traceability and visibility of ownership, and highly fault tolerant. By ensuring the trustworthiness of the data from different sources, more reliable and accurate predictions and plans can be generated by the machine learning models, resulting in higher quality responses to natural disasters.

Figure 3:
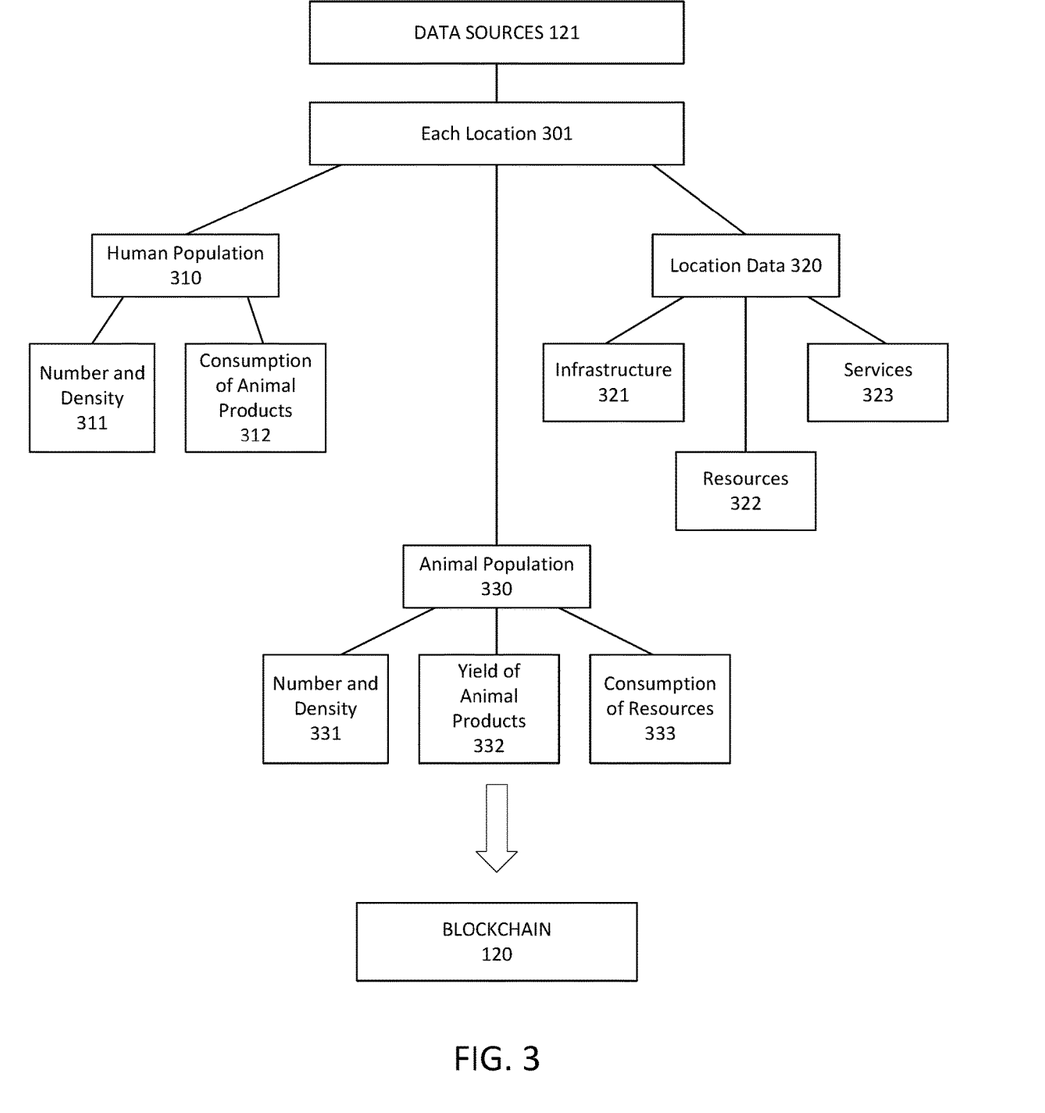
FIG. 3 illustrates exemplary data stored in the blockchain according to some embodiments of the present invention.

FIG. 3 illustrates exemplary data stored in the blockchain 120 according to some embodiments of the present invention. Data feeds from a plurality of data sources 121 are gathered and stored in the blockchain 120. The data sources 121 can include government entities at the federal, state, and/or local levels, and data collected by private industries. The natural disaster response service 101 can subscribe to the data feeds, continuously receive data from the feeds, and stores the receives data in the blockchain 120. For each geographic location 301, human population data 310 is gathered and stored in the blockchain 120, which can include the number and density 311 of the human population and the consumption of animal products 312 by the human population at the location. For each location 301, animal population data 330 is also gathered and stored in the blockchain 120, which can include the number and density of the animal population 311, the yield of animal products 332 from the animal population 330, and the consumption of resources by the animal population 333. Any level of granularity of the animal population data can be provided, such as by species. The animal population data can also be identified by category, such as livestock, farm animals, zoo animals, and pets. For each location 301, location data 320 is also gathered and stored in the blockchain 120, which can include infrastructure data 321 (e.g. terrain, waterways, bridges, and roads), resources 322 (e.g. water or electricity), and services 323 (e.g. veterinary clinics). In some embodiments, animal population data from public and private zoos and animal farms, and any supplies and services they are able to provide, are included in the animal population and location data 330, 320.

Figure 2:
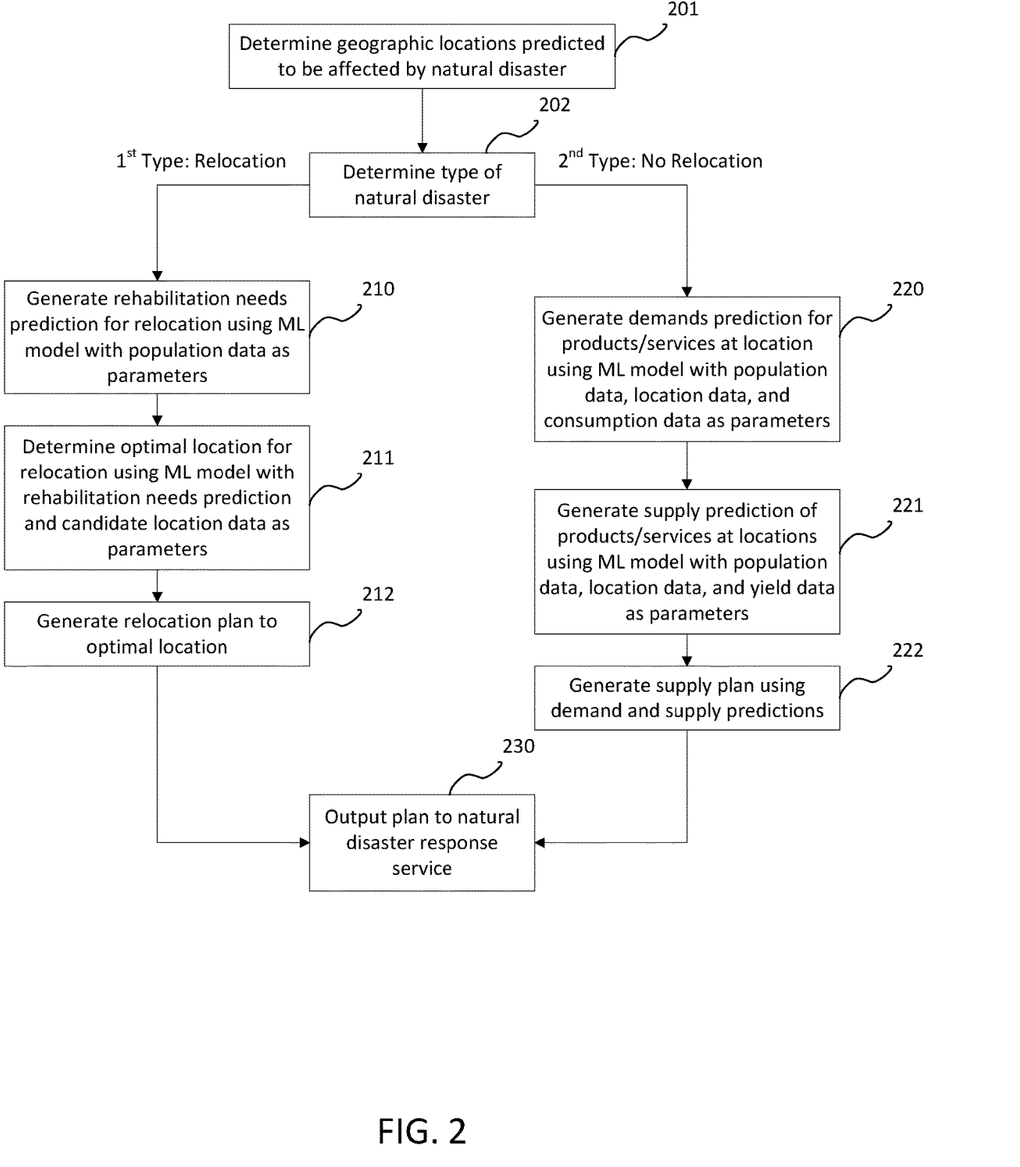
FIG. 2 illustrates a natural disaster response service according to exemplary embodiments of the present invention.

FIG. 2 illustrates a natural disaster response service according to exemplary embodiments of the present invention. With data from the weather service 130, the service 101 determines geographic locations predicted to be affected by a natural disaster (201). The service 101 determines the type of natural disaster (202). In some embodiments, natural disasters are defined as one of at least two types: a first type where relocation of human and animal populations at the affected location is required; and a second type where relocation is not required. For example, tornados, floods, wildfires, or the like, are defined as the first type of natural disaster, while droughts or the like are defined as the second type of natural disaster.

When the natural disaster is determined to be of the first type, the rehabilitation needs predictor 102 generates a rehabilitation needs prediction for the relocation of human and animal populations from the affected location, using the machine learning models 106 with at least human population data 310 and animal population data 330 as parameters input into the models 106 (210). The rehabilitation needs prediction can include any combination of the infrastructure, resources, and services that the machine learning models 106 determine will be needed to support the relocation of the human and animal populations. The relocation planner 103 determines an optimal location for relocation of the human and animal populations using the machine learning models 106. The relocation planner 103 uses the machine learning models 106 to evaluate multiple candidate locations, with at least the rehabilitation needs prediction and location data 320 for each candidate location data as parameters input into the models 106 (211). The machine learning models 106 are configured to select the optimal location from the candidate locations, incorporating relevant factors, such as the distance from the affected location to the candidate location, the lead time for relocation of the human and animal population to the candidate location, the cost of services at the candidate location, and the infrastructure capacity based on species type in the animal population. The machine learning models 106 can be configured to exclude candidate locations that have been identified as affected or predicted to be affected by natural disasters. In some embodiments, multiple optimal locations are selected, where the human and/or animal populations are divided into groups, where each group is to be relocated to a different optimal location. For example, no single candidate location may not be able to accommodate the entire animal population to be relocated. However, multiple candidate locations can collectively accommodate the animal population. Once the optimal location is determined, the relocation planner 103, using the machine learning models 106, generates a relocation plan to relocate the human and animal populations to the optimal location (212). The relocation plan may include, but not be limited to, the transportation logistics needed for the relocation and the supplies and services required during the relocation. When multiple optimal locations are selected, a relocation plan is generated for each optimal location.

When the natural disaster is determined to be of the second type, where no relocation of human and animal populations is required, the demand and supply predictor 104 generates a demands prediction for products and services at the affected location using the machine learning models 106, with at least the human and animal population data 310, 330, the location data 320, and human and animal consumption data 312, 333 as parameters input into the machine learning models 106 (220). The demands prediction includes the food, water, shelter, medical care, and other products or services predicted to be consumed by the human and animal populations at the affected location. The demand and supply predictor 104 further generates a supply prediction of products and services at the affected location and other locations using the machine learning models 106, with at least the human and animal population data 310, 330, the location data 320, and data on the yield of animal products 332 by the animal population, as parameters input into the machine learning models 106 (221). The supply planner 105, using the machine learning models 106, generates a supply plan using the demand and supply predictions (222). In some embodiments, the machine learning models 106 are configured to generate a supply plan that meets the predicted demand balanced against the predicted supply. For example, the lead time for moving supplies to the affected location and the cost of providing the supplies can be considered when generating the supply plan. The demand and supply predictor 104 predicts excess yields of products or services at other locations, and the supply planner 105 includes in the supply plan the movement of the excess products or services from the other locations to the affected location.

In some embodiments, when human and animal populations at a location affected by a natural disaster of the first type has relocated to the optimal location, the human and animal population data 310, 330 for the optimal location is updated and stored in the blockchain 120. The demands prediction, supply prediction, and supply plan for the optimal location can then be generated per blocks 220-222 using the updated data.

In some embodiments, the machine learning models 106 are configured using the random forest method. Random forest is an ensemble machine learning technique capable of performing both regression and classification tasks using multiple decision trees, where the decision trees are run in parallel. Random forest builds multiple decision trees and merge their predictions together to obtain a more accurate and stable prediction than if relying on individual decision trees. The machine learning models 106 can be trained using historical observations from past natural disasters. In some embodiments, each decision tree in the random forest learns from a different sample of the training observations. By training each decision tree on different samples, although each decision tree may have a high variance with respect to a particular set of training data, the forest as a whole will have lower variance without increasing bias. By configuring the machine learning models 106 using the random forest method, the complex and multi-dimensional interrelationships between human and animal populations within a geographic location can be captured and used to generate reliable predictions and plans.

Figure 4A:
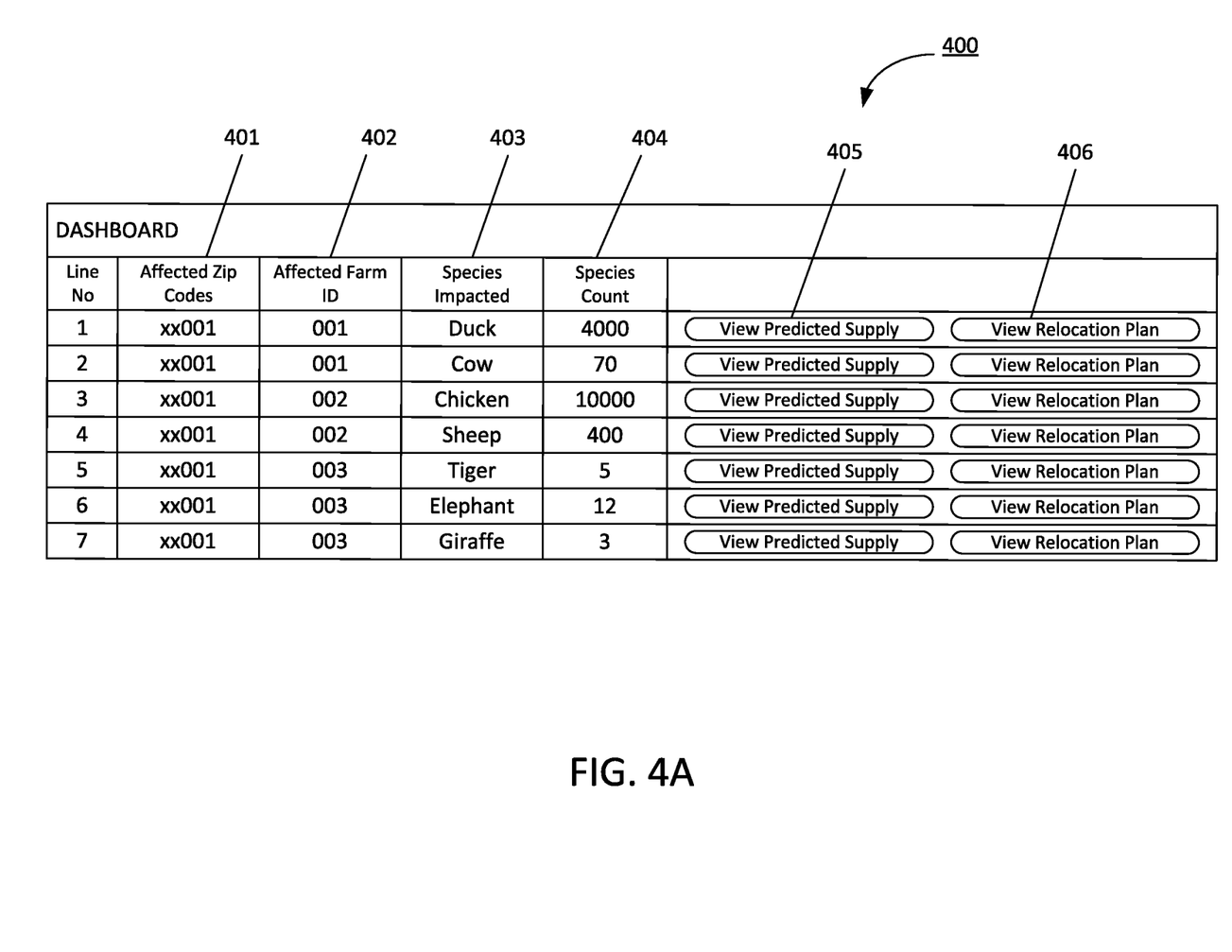
FIGS. 4A-4C illustrate exemplary interfaces according to some embodiments of the present invention.
Figure 4B:
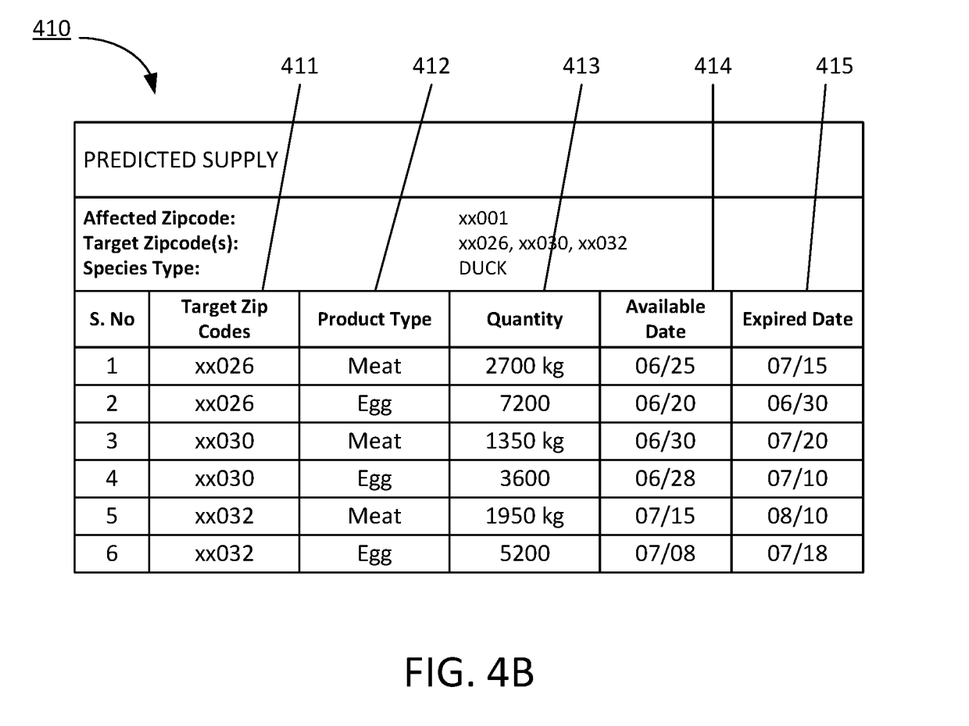
Figure 4C:
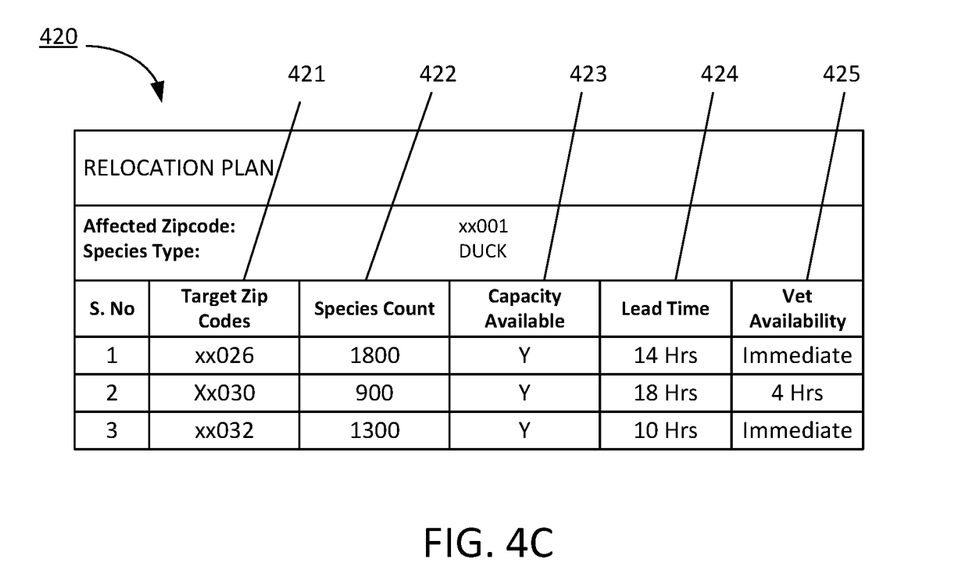

The relocation plan and/or the supply plan are output to the natural disaster response service 101. The plans, and optionally the underlying data used to generate the plans, can be made accessible via an interface or dashboard at a client device 140. FIGS. 4A-4C illustrate exemplary interfaces according to some embodiments of the present invention. As illustrated in FIG. 4A, information generated by the natural disaster response service 101, as described above, can be provided to a user via a dashboard 400 at the client device 140. In this example, results concerning the animal population on affected farms in the affected location are displayed. The affected location is broken down by zip code 401, which is further broken down by farm identifier 402 and animal species 403 in the animal population at the affected location. Optionally, a species count 404 is also displayed. For each zip code, farm, and species combination, options to view the predicted supply 405 and the relocation plan 406 are provided. Continuing with the example of FIG. 4A, FIG. 4B illustrates an exemplary predicated supply 410 as displayed via the dashboard 400. Illustrated is the exemplary predicated supply for a specifically affected zip code (xx001), target zip codes (xx026, xx030, xx032), and species type (duck) combination. The target zip codes refer to candidate locations considered in determining the optimal location, as described above. The predicted supply is broken down by target zip codes 411, which is further broken down by product types 412. For each target zip code 411 and product type 412 combination, the quantity 413 of the product type is displayed, along with the date 414 when the product will be available and the date 415 of expiration of the availability. FIG. 4C illustrates an exemplary relocation plan 420 as displayed via the dashboard 400. Illustrated is the exemplary relocation plan 420 for a specifically affected zip code (xx001) and species type (duck) combination. The relocation plan is broken down by target zip codes 421. In this example, the population of species is to be divided and relocated to three target zip codes 421. The relocation plan 420 includes the species count 422 of the number of animals of that species to be relocated to each target zip code, whether the capacity 423 is currently available at the target zip code, the lead time 424 required for relocating the number of animals to the target zip code, and the availability of services for the species at the target zip code, such as vet services 425.

In some embodiments, instead of or in addition to providing access to the relocation and/or supply plan, the natural disaster response service 101 may automatically, without human intervention, execute the relocation or supply plan. The execution can apply to the entirety of the relocation or supply plan or apply to a portion of either plan. For example, the natural disaster response service 101 may automatically place orders for supplies, issue commands to transportation systems, interface with utilities to obtain resources, interface with municipal, state or federal response services, interface with emergency services, and execute other tasks in the relocation or supply plans.

Figure 5:
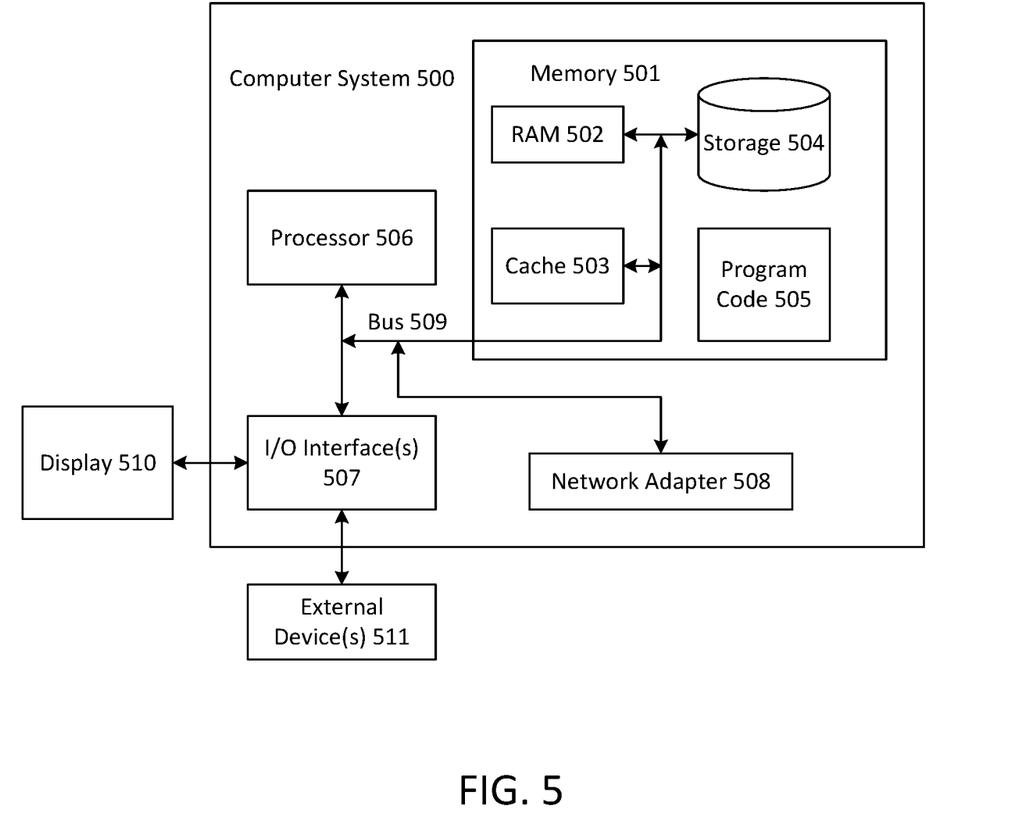
FIG. 5 illustrates a computer system, one or more of which implements the server 500 according to exemplary embodiments of the present invention.

FIG. 5 illustrates a computer system, one or more of which implements the server 500 according to exemplary embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

Although exemplary embodiments of the present invention are described above in the context of natural disasters, the embodiments may also be used for predictive planning for human-made disasters as well without departing from the spirit and scope of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for predictive natural disaster response, comprising:
   determining, by a server, at least one affected location, the affected location predicted to be affected by a natural disaster;
   determining, by the server, whether the type of natural disaster requires relocation of an animal population at the affected location;
   in response to determining that the relocation is not required:
      generating, by the server, a demands prediction for products and services at the affected location using a set of machine learning models, wherein parameters input into the set of machine learning models comprise the population data for the animal population and a human population at the affected location, location data for the affected location, and consumption data for the animal population and the human population at the affected location;
      generating, by the server, a supply prediction for the products and the services at the affected location using the set of machine learning models, wherein the parameters input into the set of machine learning models comprise the population data for the animal population and the human population at the affected location, the location data for the affected location, and yield data for the animal population at the affected location;
      generating, by the server, a supply plan using the set of machine learning models, wherein the parameters input into the set of machine learning models comprise the demands predication and the supply prediction; and
      providing access to the supply plan by an interface over a computer network.

2. The method of claim 1, further comprising:
   in response to determining that the relocation is required:
      generating, by the server, a rehabilitation needs prediction for the relocation using the set of machine learning models, wherein parameters input into the set of machine learning models comprise population data for the animal population at the affected location;

determining, by the server, at least one optimal location for the relocation from a plurality of candidate locations, using the set of machine learning models, wherein the parameters input into the set of machine learning models comprise the rehabilitation needs prediction and candidate location data for each of the plurality of candidate locations; and generating, by the server using the set of machine learning models, a relocation plan to relocate the animal population from the affected location to the at least one optimal location.

3. The method of claim 1, wherein after relocation of the animal population to the optimal location, the method further comprising:

updating the population data, the consumption data, and the yield data for the animal population at the optimal location;

generating, by the server, an updated demands prediction for the products and the services at the optimal location using the set of machine learning models, wherein the parameters input into the set of machine learning models comprise the updated population data and the updated consumption data for the animal population;

generating, by the server, an updated supply prediction for the products and the services at the optimal location using the set of machine learning models, wherein the parameters input into the set of machine learning models comprise the updated population data and the updated yield data for the animal population at the optimal location; and generating, by the server, the supply plan using the set of machine learning models, wherein the parameters input into the set of machine learning models comprise the updated demands predication and the updated supply prediction.

4. The method of claim 1, further comprising:

retrieving, by the server, the parameters input into the set of machine learning models from data stored in a blockchain.

5. The method of claim 1, wherein the determining of the at least one optimal location and the generating of the relocation plan comprise:

determining, by the server, a plurality of optimal locations for the relocation from the plurality of candidate locations using the set of machine learning models;

dividing, by the server, the animal population into groups; and generating, by the server, the relocation plan using the set of machine learning models to relocate each group of the animal population to a different optimal location of the plurality of optimal locations.

6. The method of claim 1, wherein the generating of the supply prediction and the generating of the supply plan comprise:

predicting, by the server using the set of machine learning models, that another location will have an excess supply of the products or the services; and generating, by the server, the supply plan using the set of machine learning models, wherein the supply plan includes movement of the excess supply of the products or the services from the other location to the affected location.

7. The method of claim 1, wherein the set of machine learning models are configured with multiple decision trees and configured to use a random forest ensemble machine learning technique.

8. A computer program product for predictive natural disaster response, the computer program product comprising a computer readable storage medium having program instructions embodied therewith, the program instructions executable by a computer system, to cause the computer system to:

determine at least one affected location, the affected location predicted to be affected by a natural disaster;

determine whether the type of natural disaster requires relocation of an animal population at the affected location;

in response to determining that the relocation is not required:

generating, by the server, a demands prediction for products and services at the affected location using a set of machine learning models, wherein parameters input into the set of machine learning models comprise the population data for the animal population and a human population at the affected location, location data for the affected location, and consumption data for the animal population and the human population at the affected location;

generating, by the server, a supply prediction for the products and the services at the affected location using the set of machine learning models, wherein the parameters input into the set of machine learning models comprise the population data for the animal population and the human population at the affected location, the location data for the affected location, and yield data for the animal population at the affected location;

generating, by the server, a supply plan using the set of machine learning models, wherein the parameters input into the set of machine learning models comprise the demands predication and the supply prediction; and providing access to the supply plan by an interface over a computer network.

9. The computer program product of claim 8, wherein the computer system is further caused to:

in response to determining that the relocation is required:

generating, by the server, a rehabilitation needs prediction for the relocation using the set of machine learning models, wherein parameters input into the set of machine learning models comprise population data for the animal population at the affected location;

determining, by the server, at least one optimal location for the relocation from a plurality of candidate locations, using the set of machine learning models, wherein the parameters input into the set of machine learning models comprise the rehabilitation needs prediction and candidate location data for each of the plurality of candidate locations; and generating, by the server using the set of machine learning models, a relocation plan to relocate the animal population from the affected location to the at least one optimal location.

10. The computer program product of claim 8, wherein after relocation of the animal population to the optimal location, the computer system is further caused to:

update the population data, the consumption data, and the yield data for the animal population at the optimal location;

generate an updated demands prediction for the products and the services at the optimal location using the set of machine learning models, wherein the parameters input into the set of machine learning models comprise the updated population data and the updated consumption data for the animal population;

generate an updated supply prediction for the products and the services at the optimal location using the set of machine learning models, wherein the parameters input into the set of machine learning models comprise the updated population data and the updated yield data for the animal population at the optimal location; and generate the supply plan using the set of machine learning models, wherein the parameters input into the set of machine learning models comprise the updated demands predication and the updated supply prediction.

11. The computer program product of claim 8, wherein the computer system is further caused to:
retrieve the parameters input into the set of machine learning models from data stored in a blockchain.

12. The computer program product of claim 8, wherein in determining the at least one optimal location and in the generating of the relocation plan, the computer system is further caused to:
determine a plurality of optimal locations for the relocation from the plurality of candidate locations using the set of machine learning models;
divide the animal population into groups; and
generate the relocation plan using the set of machine learning models to relocate each group of the animal population to a different optimal location of the plurality of optimal locations.

13. The computer program product of claim 8, wherein in the generating of the supply prediction and in the generating of the supply plan, the computer system is further caused to:
predict, using the set of machine learning models, that another location will have an excess supply of the products or the services; and
generate the supply plan using the set of machine learning models, wherein the supply plan includes movement of the excess supply of the products or the services from the other location to the affected location.

14. The computer program product of claim 8, wherein the set of machine learning models are configured with multiple decision trees and configured to use a random forest ensemble machine learning technique.

15. A system comprising:
a processor; and
a computer readable storage medium having program instructions embodied therewith, the program instructions executable by the processor, to cause the processor to:
determine at least one affected location, the affected location predicted to be affected by a natural disaster;
determine whether the type of natural disaster requires relocation of an animal population at the affected location;
in response to determining that the relocation is not required:
generating, by the server, a demands prediction for products and services at the affected location using a set of machine learning models, wherein parameters input into the set of machine learning models comprise the population data for the animal population and a human population at the affected location, location data for the affected location, and consumption data for the animal population and the human population at the affected location;

generating, by the server, a supply prediction for the products and the services at the affected location using the set of machine learning models, wherein the parameters input into the set of machine learning models comprise the population data for the animal population and the human population at the affected location, the location data for the affected location, and yield data for the animal population at the affected location;

generating, by the server, a supply plan using the set of machine learning models, wherein the parameters input into the set of machine learning models comprise the demands predication and the supply prediction; and providing access to the supply plan by an interface over a computer network.

16. The system of claim 15, wherein the processor is further caused to:
in response to determining that the relocation is required:
generating, by the server, a rehabilitation needs prediction for the relocation using the set of machine learning models, wherein parameters input into the set of machine learning models comprise population data for the animal population at the affected location;
determining, by the server, at least one optimal location for the relocation from a plurality of candidate locations, using the set of machine learning models, wherein the parameters input into the set of machine learning models comprise the rehabilitation needs prediction and candidate location data for each of the plurality of candidate locations; and
generating, by the server using the set of machine learning models, a relocation plan to relocate the animal population from the affected location to the at least one optimal location.

17. The system of claim 15, wherein after relocation of the animal population to the optimal location, the processor is further caused to:
update the population data, the consumption data, and the yield data for the animal population at the optimal location;
generate an updated demands prediction for the products and the services at the optimal location using the set of machine learning models, wherein the parameters input into the set of machine learning models comprise the updated population data and the updated consumption data for the animal population;
generate an updated supply prediction for the products and the services at the optimal location using the set of machine learning models, wherein the parameters input into the set of machine learning models comprise the updated population data and the updated yield data for the animal population at the optimal location; and
generate the supply plan using the set of machine learning models, wherein the parameters input into the set of machine learning models comprise the updated demands predication and the updated supply prediction.

18. The system of claim 15, wherein the processor is further caused to:
retrieve the parameters input into the set of machine learning models from data stored in a blockchain.

19. The system of claim 15, wherein in determining the at least one optimal location and in the generating of the relocation plan, the processor is further caused to:

determine a plurality of optimal locations for the relocation from the plurality of candidate locations using the set of machine learning models;
divide the animal population into groups; and
generate the relocation plan using the set of machine learning models to relocate each group of the animal population to a different optimal location of the plurality of optimal locations.

20. The system of claim 15, wherein in the generating of the supply prediction and in the generating of the supply plan, the processor is further caused to:
predict, using the set of machine learning models, that another location will have an excess supply of the products or the services; and
generate the supply plan using the set of machine learning models, wherein the supply plan includes movement of the excess supply of the products or the services from the other location to the affected location.

\* \* \* \* \*